No. 746,888. PATENTED DEC. 15, 1903.
R. C. SMITH.
CALCULATING SCALE.
APPLICATION FILED JAN. 11, 1900.
NO MODEL. 3 SHEETS—SHEET 1.
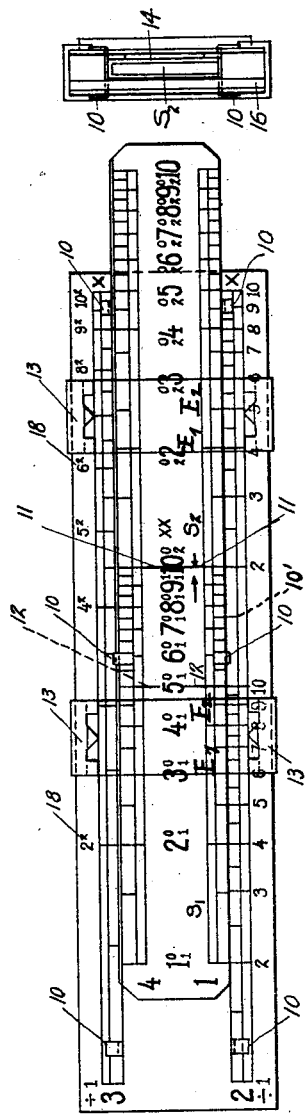
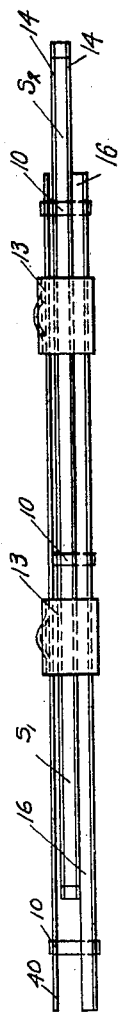
WITNESSES:
Arthur Marion.
Anna V. Broderick.
INVENTOR
Rudolph C. Smith,
BY
Chas. C. Gill
ATTORNEY No. 746,888. PATENTED DEC. 15, 1903.
R. C. SMITH.
CALCULATING SCALE.
APPLICATION FILED JAN. 11, 1900.
NO MODEL. 3 SHEETS—SHEET 2.

WITNESSES:
Arthur Marion
Anna V. Broderick

INVENTOR
Rudolph C. Smith,
BY
Chas. C. Gill
ATTORNEY

No. 746,888. PATENTED DEC. 15, 1903.
R. C. SMITH.
CALCULATING SCALE.
APPLICATION FILED JAN. 11, 1900.
NO MODEL. 3 SHEETS—SHEET 3.

WITNESSES:
Arthur Marion.
Anna V. Broderick.

INVENTOR
Rudolph C. Smith
BY
Chas. O. Gill
ATTORNEY

No. 746,888. Patented December 15, 1903.

UNITED STATES PATENT OFFICE.

RUDOLPH C. SMITH, OF YONKERS, NEW YORK.

CALCULATING-SCALE.

SPECIFICATION forming part of Letters Patent No. 746,888, dated December 15, 1903.

Application filed January 11, 1900. Serial No. 1,105. (No model.)

*To all whom it may concern:*

Be it known that I, RUDOLPH C. SMITH, a citizen of the United States, and a resident of Yonkers, in the county of Westchester and State of New York, have invented certain new and useful Improvements in Calculating-Scales, of which the following is a specification.

The invention relates to improvements in calculating-scales.

The object of my invention is to provide an attachment to the logarithmic slide-rule by which the decimal value of the figures is registered mechanically. It is well known that the slide-rule as made at present does not show whether these figures are hundreds, tens, or thousands or any other multiple of ten. I attain the result of registering mechanically the correct decimal of slide-rule computations by the mechanism illustrated in the accompanying drawings, in which—

Figure 3:
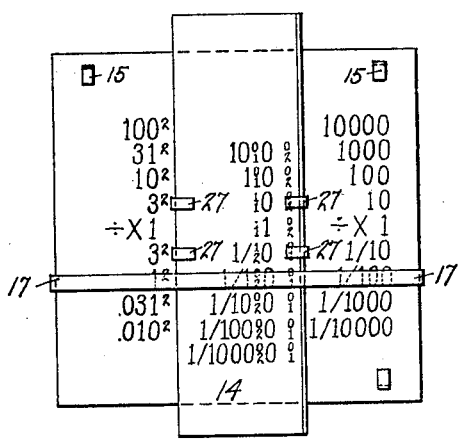
Figure 4:
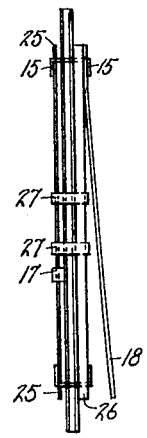
Figure 5:
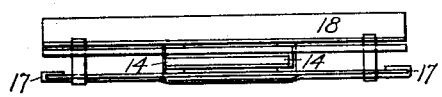
Figure 7:
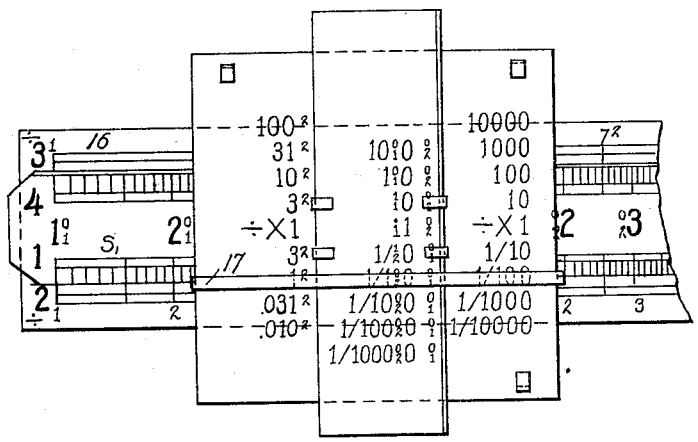
Figure 8:
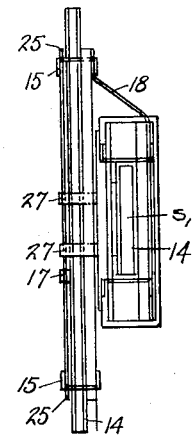
Figure 9:
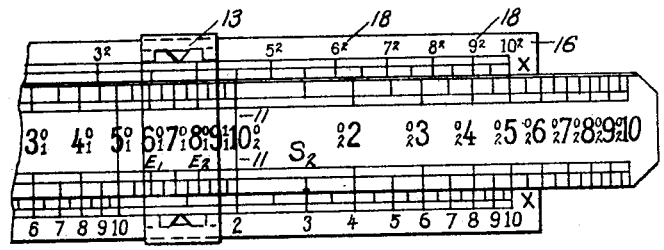
Figure 10:
Figures 11, 12:
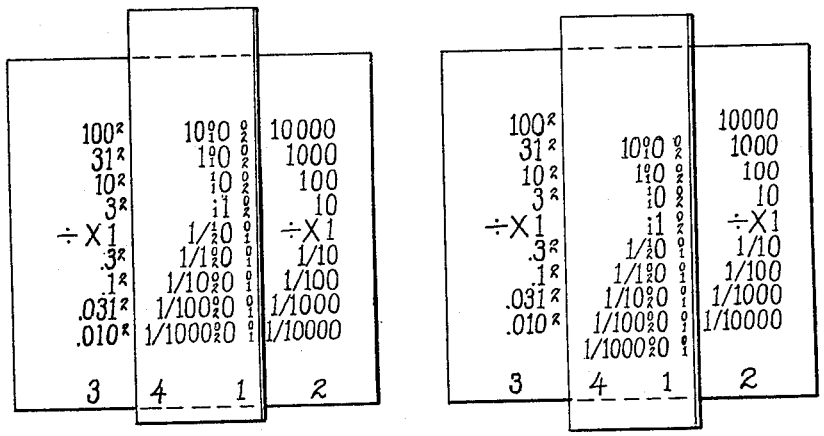

Figure 1 is a side view of a slide-rule embodying my invention. Fig. 2 is a plan view of the same. Fig. 3 is a plan view of the auxiliary or decimal scale embodying my invention. Fig. 4 is a side view of the same. Fig. 5 represents an end view of same. Fig. 6 is the end view of the main slide. Fig. 7 shows the auxiliary rule or decimal scale in position on the main slide-rule. Fig. 8 is the end view of the same. Fig. 9 is a plan view, partly broken away, of the main slide-rule and is presented to illustrate the complete subdivisional marks on the same. Fig. 10 is a like view of the same with the slide moved toward the left, and Figs. 11 and 12 are plan views of the auxiliary or decimal rule with the slide thereof in positions corresponding with the positions of the parts of the slide-rule in Figs. 9 and 10.

The structure of the parts of the slide-rule, which are not claimed as novel in this application, is made in accordance with United States Patent No. 592,067, dated October 19, 1897.

The body 16 16, Figs. 1 and 2, of the rule is of cardboard, with the ordinary logarithmic scales of the slide-rule printed on the same.

The scale 3 of the stationary body of the main rule 16 16, Fig. 2, is arranged with an exponent affixed to the numbers of the main scale 18. The main slide $S'$ $S^2$ of the main rule, Fig. 2, is divided in two scales, the left-hand scale $S'$ and the right-hand scale $S^2$. The main slide slides on the main body 16 16 and is guided by clamps 10 10, which pass through perforations of the body of the main rule and are bent over the flexible transparent plates of the body of main rule, Fig. 6, said clamps 10 10 leaving clearance for an easy motion of the slide. This is a novel construction and is not shown in said Patent No. 592,067, dated October 17, 1897.

The right-hand end of the left half of the main slide and the beginning of the right half is designated and divided by a line 11 11 on the main slide and by a line 12 12 on the transparent cover. On the main slide $S'$ $S^2$ I engrave or print, in addition to the usual figures, any conventional signs of notation; but I use the same signs of notation on the auxiliary slide of the auxiliary scale, as hereinafter described. I prefer to mark line 11 11 with a "10" and to have an adjacent "1" on the left half and an adjacent "0" on the right half $x$ $x$ in the position shown on the drawings, Fig. 2. Underneath these figures I place two signs to designate the right and the left half, and for these signs I have used in the annexed drawings the numerals 1 and 2. A sliding clamp or cursor 13 13 is a common attachment to slide-rules used for the purpose of marking and fixing certain numbers on the scale, as is well understood. I attach to the face of this clamp a flexible transparent plate, preferably of celluloid, with the edges (marked $E'$ $E^2$) free of the main body of the clamp, so as to form a sleeve with a transparent indicator without any obstruction along the transparent edges, which might interfere with the reading of the figures on the scales of the main rule.

The left-hand transparent edge is marked $E'$, and the right-hand edge is marked $E^2$ or with any other conventional notation similar to the one used on the middle of the slide to distinguish the figures of the right-hand half of the main slide from the figures of the left-hand half. The edge marked $E'$ is used to fix or mark figures on the left half of the scales of the main slide and of the stationary main scales. The edge marked $E^2$ is used for the same purpose to mark the figures of the right-hand half. The auxiliary slide for indicating the unit value of tens, Figs. 3 and 7, is also, preferably, constructed with clamps and flexible transparent plates according to the United States Patents issued to Rudolph C. Smith respectively April 21, 1891, and October 19, 1897, but having on the auxiliary slide, as well as on the main body of the auxiliary rule, only the decimal values of tens, as "$\frac{1}{1000}$," "$\frac{1}{100}$," "$\frac{1}{10}$," "1," "10," "100," "1,000," &c., printed or engraved. It should be mentioned that the scales of this auxiliary slide if divided with the same divisions as shown are in the best shape for convenient operation; but a practical computation may be performed with an instrument where the auxiliary stationary scales have only one single index-mark corresponding to the "1" of the auxiliary slide. This auxiliary slide-rule for obtaining the decimal value is attached to the main slide-rule, so as to be shifted into positions where it does not obstruct the reading of the figures of the main rule and main slide or the use of the sliding index-clamps 13 13. For this purpose I attach the flexible transparent cover 18′, Fig. 4, on the back of the auxiliary stationary rule only at its upper end by means of the clamps 15 15, Fig. 3. Being detached on one side, this cover-piece may be placed conveniently to ride on the flexible covers of the main rule and can be easily shifted lengthwise to any position on the main rule or taken out altogether if it is necessary to get from one side of the main index-cursor 13 13 to the other.

This auxiliary slide, which, as has been described, is provided with figures indicating only the multiple of ten, has the same divisions on the slide as on the stationary part and has its divisions marked to constitute three scales whose readings differ, respectively, by one tenth. For instance, the same division-mark will be figured "10" "100" "1,000." To save in width, I have marked the ciphers of the decimals, so as to distinguish three scales with one set of numerals. Instead of marking the three readings increasing tenfold from left to right in full print—say, for instance, "10" "100" "1,000"—I use "$1^0_1$0$^0_2$," where "$1^0_1$" stands for ten, "$1^0_10$" stands for one hundred, and "$1^0_10^0_2$" stands for one thousand. The visual sign "1" is the same as that used to mark the figures of the left half of the main slide, and the visual sign 2 is the same as that used on the figures of the right half of the main rule. Any other shape of signs attached to the ciphers and figures would be equally useful—for instance, using different colors for the same purpose.

To register the decimal value of the figure registered by the main rule, the following instructions must be followed: To register a ratio—say three-sixths—on the main rule, observe that the denominator is always registered by moving the edge of the cursor of the main rule to the number of the denominator on its slide, the figures of the slide before the first move coinciding with the main stationary scale. To complete the setting of the ratio, move now the main slide until the number of the numerator registers with the proper edge of the cursor. The "10" on the end of the main stationary rule registers now the ratio on the "5" of the main slide without giving its true decimal value 0.5. (See Fig. 9.) It also registers "$\frac{3}{6} \times 15$" above "15" as "7.5" on the main slide. (See Fig. 2, numeral 10.) The decimal value of these readings registered on the main rule are found on the auxiliary rule by the following operation: The decimal value of the first figure of the numbers used in every move for registering on the main rule must be used in repeating the same moves of denominator with the cursor 17 of the auxiliary rule and of the numerator with the slide of the auxiliary rule, using, as explained, the decimal value. For instance, if the number used on the main rule was "625" the number used with the auxiliary scale would be "100." The decimal value of the denominator on the slide and the value of the decimal on the stationary main scale are always directly given on the auxiliary scales without the special signs, while the decimal value of the numerator is given on the middle auxiliary scale, calling "middle" the one without the special signs, only when moving the main slide with a numerator of the same notation as that of the edge of the cursor to which it is moved—for instance, when the "3" of our example is moved to edge E′ of the cursor.

To read the decimal value on the auxiliary slide, note that the decimal values of all numbers on the main slide which in setting the logarithmic main slide coincide with the numbers of the stationary part outside of the middle line of the slide and the middle line 12 12 of the stationary part are registered by the auxiliary slide with the ciphers without special sign—that is, with that scale (in the present instance for convenience placed as the middle one) of the auxiliary slide which is without special signs and the reading of which is one-tenth of the reading of one of the adjacent scales and ten times the reading of the other scale.

The decimal value of those numbers of the slide of the logarithmic slide-rule which in setting coincide with the numbers of the stationary part inside of the middle line 11 11 of the halves of the slide and the middle line of the stationary part with the signal "1" must be read on the auxiliary scale with the ciphers with the signal "1." If these numbers have the signal "2," the decimal will be taken with the ciphers marked with the signal "2."

For every move with the slide of the logarithmic scale a corresponding move of the slide of the auxiliary scale must be made, using the decimal values of the numbers moved with the main scale.

A few further illustrations will explain the operation.

Example 1. $\frac{3}{6} \times 15 = 7.5$. On main slide set "3" of the slide over "6" of the stationary part or move edge E of cursor to "$6_1$" of the main slide and slide with "$3_1$" to edge E'. The ratio "$\frac{3}{6}$" is set outside of the middle line of the slide and the middle line 12 12, Fig. 1, and in setting the decimal value of this ratio the middle column of ciphers without signals must be used—that is, $1 \div 1$, or the "1" of the slide of the auxiliary scale is set to the "1" of the stationary part. The "15" on the stationary part coincides with the "7.5" of the slide on the logarithmic slide, and the ratio is inside of the middle lines 11 11 and 12 12, and the half on which "7.5" is read has the signal "1." This signal directs that the decimal value of seventy-five is given by the cipher with the signal "1" over "10" of stationary part of the auxiliary scale. We read "1" in the column marked with the signal "1."

Example 2. $\frac{6}{3} \times 8 = 16$. To set the ratio "$\frac{6}{3}$," set "6" on logarithmic slide to "3" of stationary part. This ratio is outside of the middle lines, and its decimal value is registered on the auxiliary scale with the cipher without signals—that is, the "1" of the slide coincides with the "1" of the stationary part. The "16" on the logarithmic slide is inside of the middle lines 11 11 and 12 12, and the half of the logarithmic slide is marked with the signal "2," and the decimal value of sixteen will be registered on the slide of the auxiliary scale by using the column marked with the signal "2." I find in this column "10" to coincide with the "1" of the stationary part. The decimal value of sixteen is ten, or sixteen. The same operation will register the decimal value of more complicated problems by using the signals as described in the above instructions, and the problems will be solved mechanically by the relation of the division-lines and their signals.

What I claim as my invention, and desire to secure by Letters Patent, is—

1. A slide-rule having a stationary body or part, and a sliding part, the sliding part having thereon the figure "1" and to the right or above the same the figures 10, 100, 1000, &c., and below or to the left of the same the figures $\frac{1}{10}$ $\frac{1}{100}$ $\frac{1}{1000}$, &c., while the said stationary part has adjacent to the edge of the sliding part, the same divisions and figures, said figures on the main and sliding parts being arranged in equally-spaced lines; substantially as set forth.

2. In combination with the logarithmic slide-rule, an auxiliary slide-rule having a stationary body or part, and a sliding part, the sliding part having thereon the figure "1" and to the right or above the same the figures 10, 100, 1000, &c., and below or to the left of the same the figures $\frac{1}{10}$ $\frac{1}{100}$ $\frac{1}{1000}$, &c., while the said stationary part has adjacent to the edge of the sliding part, the same divisions and figures, said figures on the main and sliding parts being arranged in equally-spaced lines; substantially as set forth.

3. A slide-rule having a stationary body or part, and the sliding part, the sliding part having thereon three columns with three readings of multiples of ten of which one reading is one-tenth of another, which is ten times the remaining one, and having its slide and stationary part with equal spacing, marked respectively with a continuous series of powers of ten; substantially as set forth.

4. In combination with the logarithmic slide-rule, an auxiliary slide-rule having a stationary body or part, and a sliding part, the sliding part having thereon three columns of multiples of ten of which one reading is one-tenth of another, which is ten times the remaining one, and having an equal spacing marked respectively with the continuous series of powers of ten; substantially as set forth.

5. The main slide-rule having the body and slide, said slide having thereon at one portion the numerals bearing an indicating notation character as $^0_1$, and at the other portion thereof the numerals bearing a different indicating sign or notation, combined with the auxiliary slide-rule having a stationary part or body and a sliding part, the sliding part having the figures $\frac{1}{100}$ $\frac{1}{10}$ 1 10 100 1000, &c., and also the column to the right of said figures containing conventional signs or marks of notation, as $^0_1$ $^0_2$ indicating the relation of this column to the corresponding parts of the main slide, while the said stationary part of said auxiliary rule bears the same divisions and figures of the said sliding part of said rule; substantially as set forth.

6. The main slide-rule having the body and slide, said slide having thereon at one portion the numerals bearing an indicating notation character, as $^0_1$, and at the other portion thereof the numerals bearing a different indicating sign or notation, combined with the auxiliary slide-rule having a stationary part or body and a sliding part, the sliding part having the figures $\frac{1}{100}$ $\frac{1}{10}$ 1 10 100 1000, &c., the column of said figures on said slide to the left of the normal column containing conventional signs or marks of notation, as $^0_1$ $^0_2$, indicating the relation of this column to the corresponding parts of the main slide, while the said stationary part of said auxiliary rule bears the same divisions and figures of the said sliding part of said rule; substantially as set forth.

7. The main slide-rule having the body and slide, said slide having thereon at one portion the numerals bearing an indicating notation character, as $^0_1$, and at the other portion thereof the numerals bearing a different indicating sign or notation, combined with the auxiliary slide-rule having a stationary part or body and a sliding part, the sliding part having the figures $\frac{1}{100}$ $\frac{1}{10}$ 1 10 100 1000, &c., and also at the right and left of the normal column of said figures the columns containing the conventional signs of notation, as $^0_1$ $^0_2$, indicating the relation of these columns to the corresponding parts of the main slide, said column of conventional signs at the left of said normal column and below the "1" being represented by $\frac{0}{2}$ and said column of conventional signs to the right of said normal column and below "1" being represented by $\frac{0}{1}$, and said column of conventional signs at the left of said normal column and above "1" being represented by $\frac{0}{1}$, and said column of conventional signs at the right of said normal column and above the "1" being represented by $\frac{0}{2}$ (whereby the part of said right-hand column of conventional signs below the "1" has the same sign of notation as the said left-hand column above the "1," and the part of said right-hand column above the "1" has the same conventional signs as that part of the said left-hand column below the "1,") while the said stationary part of said auxiliary rule bears the same divisions and figures of the said sliding part of said rule; substantially as set forth.

8. The main slide-rule having the covering-plates, combined with the auxiliary scale slidable on the main scale and having at its rear side the flexible cover fastened at one end and free at the other end, said free end being slidable on the covering-plate and body of the main slide-rule; substantially as set forth.

9. A slide-rule with visible marks distinguishing one half of the slide from the other, with an auxiliary scale having the same distinguishing-marks on its slide, and clamps on the main scale having on their edges the same distinguishing-marks, as described.

Signed at New York, in the county of New York and State of New York, this 10th day of January, A. D. 1900.

RUDOLPH C. SMITH.

Witnesses:
CHAS. C. GILL,
GUNDER GUNDERSON.